United States Patent [19]
Hrusch et al.

[11] Patent Number: 5,806,794
[45] Date of Patent: Sep. 15, 1998

[54] AIRCRAFT BRAKING SYSTEM WITH DAMPED BRAKE ROD

[75] Inventors: Louis C. Hrusch, Chesterland; Charles Wheater, Sagamore Hills; John J. Enright, Troy, all of Ohio

[73] Assignee: The B.F.Goodrich Company, Richfield, Ohio

[21] Appl. No.: 592,816

[22] Filed: Jan. 26, 1996

Related U.S. Application Data

[63] Continuation of Ser. No. 379,240, Jan. 27, 1995, abandoned.

[51] Int. Cl.⁶ .................................................. B64C 25/42
[52] U.S. Cl. ................. 244/111; 244/110 A; 244/110 H; 267/162
[58] Field of Search .............................. 244/111, 110 A, 244/110 H; 267/162

[56] References Cited

U.S. PATENT DOCUMENTS

| | | |
|---|---|---|
| 1,584,485 | 5/1926 | Stille . |
| 2,205,138 | 6/1940 | Gould . |
| 2,469,167 | 5/1949 | Little . |
| 2,500,751 | 3/1950 | Halfvarson . |
| 2,705,633 | 4/1955 | Potter, Jr. et al. . |
| 2,710,582 | 6/1955 | Travilla . |
| 2,904,136 | 9/1959 | Greenough ........................... 244/111 X |
| 3,052,107 | 9/1962 | Kempf . |
| 3,075,406 | 1/1963 | Butler, Jr. et al. . |
| 3,109,668 | 11/1963 | Sampietro ........................... 267/162 X |
| 3,128,071 | 4/1964 | Frazer-Nash . |
| 3,273,670 | 9/1966 | Kleinlein . |
| 3,486,687 | 12/1969 | Ayling . |
| 3,519,096 | 7/1970 | Lunzer . |
| 3,857,652 | 12/1974 | Thayer . |
| 3,858,665 | 1/1975 | Winker ................................. 167/162 X |
| 3,866,720 | 2/1975 | Wallerstein, Jr. . |
| 3,918,301 | 11/1975 | Baer . |
| 4,043,607 | 8/1977 | Signorelli et al. ................... 244/111 X |
| 4,272,971 | 6/1981 | Loyd et al. . |
| 4,296,897 | 10/1981 | Thompson . |
| 4,347,042 | 8/1982 | Holdsworth . |
| 4,347,043 | 8/1982 | Morris . |
| 4,479,461 | 10/1984 | Felice et al. . |
| 4,498,369 | 2/1985 | Kaiser . |
| 4,526,047 | 7/1985 | Yang . |
| 4,545,322 | 10/1985 | Yang . |
| 4,799,653 | 1/1989 | Kramer . |
| 4,825,718 | 5/1989 | Seifert et al. . |
| 4,909,361 | 3/1990 | Stark et al. . |

(List continued on next page.)

FOREIGN PATENT DOCUMENTS

| | | | |
|---|---|---|---|
| 654482 | 8/1935 | Germany | ................................ 244/111 |
| 481691 | 8/1975 | U.S.S.R. | .................................. 267/162 |
| 873687 | 7/1961 | United Kingdom | ................... 244/111 |

OTHER PUBLICATIONS

Vibration Testing At High Loads and Frequencies, Scott F. Occhiuto, David A. Jaquish, and George S. Dulebea, The Boeing Co., DE–vol. 84–1, 1995 Design Engineering Technical Conferences, vol. 3—Part A, ASME 1995, pp. 1275–1283.

Barrie Mann, Enidine Inc., Orchard Park, NY, "A Passive Approach to Taming Vibration", *Machine Design,* Sep. 28, 1995 issue, pp. 94, 97 &101.

Werner Soedel, Purdue University, "Shell Vibrations Without Mathematics, Part II: Avanced Considerations," *Sound and Vibration,* Apr. 1976 issue, pp. 12–13.

*Primary Examiner*—William Grant
*Attorney, Agent, or Firm*—Kevin L. Leffel; Donald W. Bulson

[57] ABSTRACT

The invention is directed to a damped brake rod for use in an aircraft landing gear, the landing gear comprising a strut and a wheel and brake assembly carried on the strut. The brake rod connects the wheel and brake assembly to the strut and bears an axial load during braking. The brake rod is laterally damped to dissipate lateral vibrations imparted to the brake rod during braking.

9 Claims, 3 Drawing Sheets

U.S. PATENT DOCUMENTS

| | | |
|---|---|---|
| 4,962,826 | 10/1990 | House . |
| 4,968,010 | 11/1990 | Odobasic ................................ 267/162 |
| 5,056,738 | 10/1991 | Mercer et al. . |
| 5,056,763 | 10/1991 | Hamada et al. . |
| 5,087,491 | 2/1992 | Barrett . |
| 5,310,025 | 5/1994 | Anderson . |
| 5,326,324 | 7/1994 | Hamada . |
| 5,339,652 | 8/1994 | Dreiman . |
| 5,390,903 | 2/1995 | Fidziukiewicz . |
| 5,405,296 | 4/1995 | Cerny et al. . |
| 5,501,434 | 3/1996 | McGuire . |
| 5,590,743 | 1/1997 | Houmard et al. ................... 244/111 X |

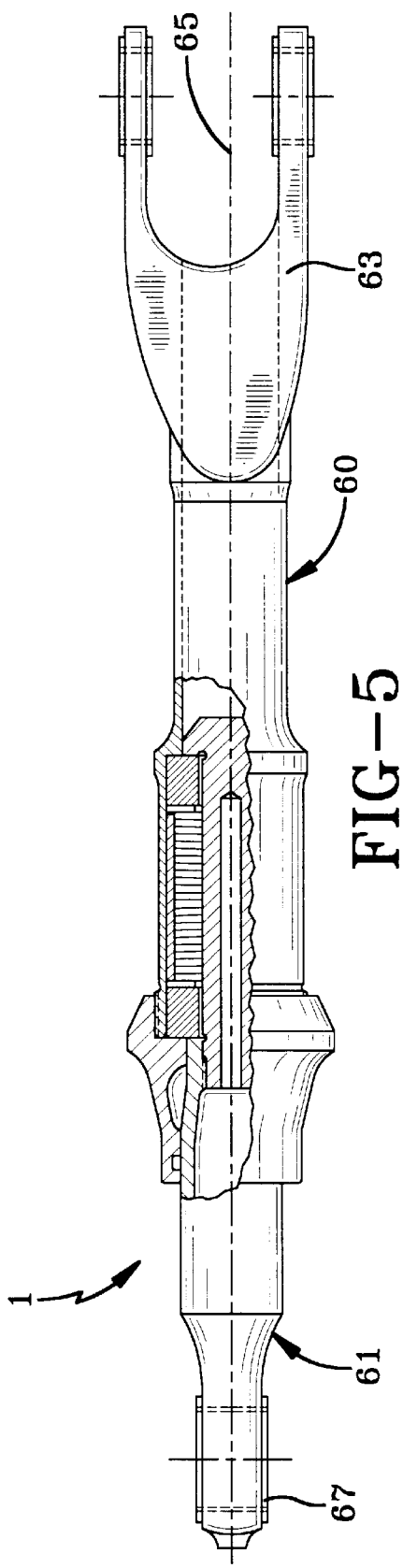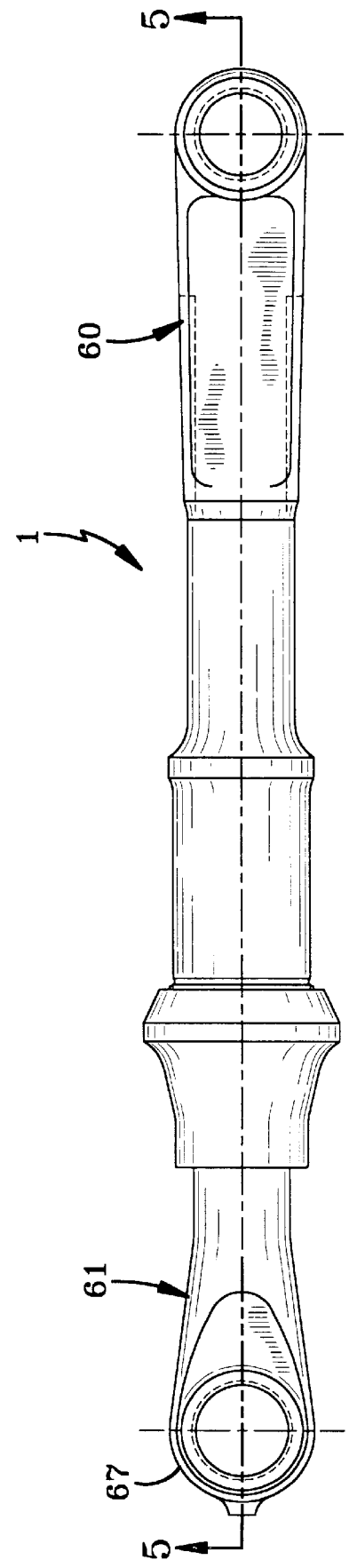

AIRCRAFT BRAKING SYSTEM WITH DAMPED BRAKE ROD

This application is a continuation of application Ser. No. 08/379,240 filed Jan. 27, 1995, now abandoned.

The invention herein described relates generally to aircraft landing gear wheel and brake systems and more particularly to a damped brake rod for use in such systems to reduce vibrations that may arise during braking.

BACKGROUND OF THE INVENTION

Wheel and brake assemblies employed in aircraft landing gear typically comprise a wheel which is supported for rotation on an axle and a brake including alternating stator and rotor discs that are brought into sliding frictional engagement with each other to retard or stop rotation of the wheel on the axle. The rotor discs rotate with the wheel while the stator discs are fixed against rotation with respect to a brake head or housing that carries a plurality of pistons that function to squeeze the stator and rotor discs together. To prevent rotation of the brake head with the wheel during braking, a brake rod is used to connect a torque lug on the brake head to the aircraft landing gear strut.

Some aircraft wheel and brake assemblies of the aforesaid type have in the past encountered a problem of excessive vibration during braking. The excessive vibration has resulted in large load swings acting on the brake rod. These load swings may damage or cause failure of the brake rod. To reduce these vibrations and high loads induced thereby, it has been proposed to use a damped brake rod.

SUMMARY OF THE INVENTION

The present invention solves the aforesaid problem of excessive vibration by the provision of a damped brake rod for connecting a wheel and brake assembly of an aircraft landing gear to the strut thereof. The brake rod is characterized by first and second rod parts connected together for relative telescoping axial movement, and a plurality of belleville washers axially interposed between axially opposed portions of the first and second rod parts for resiliently restraining movement of one rod part relative to the other rod part in at least one axial direction and more preferably in opposite axial directions.

In a preferred embodiment, the first rod part includes a piston housing, and the second rod part includes a piston guided in the piston housing for relative axially telescopically movement. Lateral clearance is provided between the piston and the piston housing for permitting limited lateral deflecting movement of the rod parts relative to one another against the resilient restraining force exerted by the plurality of belleville washers, this generating lateral coulomb damping that eliminates or reduces natural lateral vibrations induced in the brake rod. This reduces the possibility of sympathetic load multiplication as may occur if brake vibration is at the natural frequency of a brake rod not according to the invention.

Further in accordance with a preferred embodiment, the piston housing includes a piston chamber having an open end and a closed end, and an end wall closing the open end of the piston chamber. The piston includes a piston head axially movable in the piston chamber and a piston rod extending through the end wall of the piston housing. The plurality of belleville washers are interposed between the piston head and the end wall, and preferably a seal is provided between the piston rod and the end wall for preventing entry of foreign material into the piston housing. The end wall may be formed by a cap removably secured to the piston chamber.

The piston chamber in a preferred embodiment has a tubular side wall extending between open and closed ends thereof. A pair of guide bushings are disposed within the tubular side wall for slidably engaging the tubular side wall, and the guide bushings have center bores for guided passage of the piston rod. The guide bores are slightly greater in transverse dimension than the piston rod to provide the aforesaid clearance that permits limited lateral movement of the piston relative to the piston housing against the resilient restraining force of the plurality of belleville washers.

As is preferred, the plurality of belleville washers are arranged in a first group of relatively adjacent belleville washers stacked parallel one atop the other with the concave side thereof oriented in a first axial direction and a second group of relatively adjacent belleville washers stacked parallel one atop the other with the concave side thereof oriented in a second axial direction opposite the first axial direction. A wear washer may be interposed between the first and second groups of washers, and alternate ones of the belleville washers may be plated with a relatively wear resistant material to obtain the benefits of dissimilar metals in a wearing environment.

Further in accordance with a preferred embodiment of the invention, the first end second rod parts include respective axially spaced apart abutments between which the plurality of belleville washers is operatively interposed to form a double acting plunger operative to resiliently restrain relative movement of the rod parts in opposite axial directions. A pair of pusher members are provided at opposite axial ends of the plurality of belleville washers and are resiliently biased by the plurality of belleville washers respectively against the spaced apart abutments of the first rod part and respectively against the spaced apart abutments of the second rod part.

According to another aspect of the invention, an elongate member is interposed between the pusher members to limit the extent to which the belleville washers can be compressed under load applied to the brake rod. The member includes a load restraining sleeve surrounding the plurality of belleville washers. The load limiting member may be employed in other arrangements to limit the compression of resilient elements in a brake rod or other load transmitting link member.

Moreover, the aforesaid brake rod has particular application in aircraft landing gear comprising a strut; an axle carried by the strut; a wheel mounted on the axle for rotation; a brake assembly including a brake housing carried on the axle, at least one stator coupled to the brake housing against relative rotation, at least one rotor disc coupled to the wheel for rotation therewith, and at least one actuator carried by the brake housing and operable to squeeze the at least one rotor and at least one stator together into braking relationship; the brake rod being connected between the brake housing and the strut for anchoring the brake housing against rotation.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 4 is an elevational view of the damped brake rod.

FIG. 5 is a part plan view, part sectional view of the damped brake rod, with the section being taken along the line 5—5 of FIG. 4.

DETAILED DESCRIPTION

Figure 1:
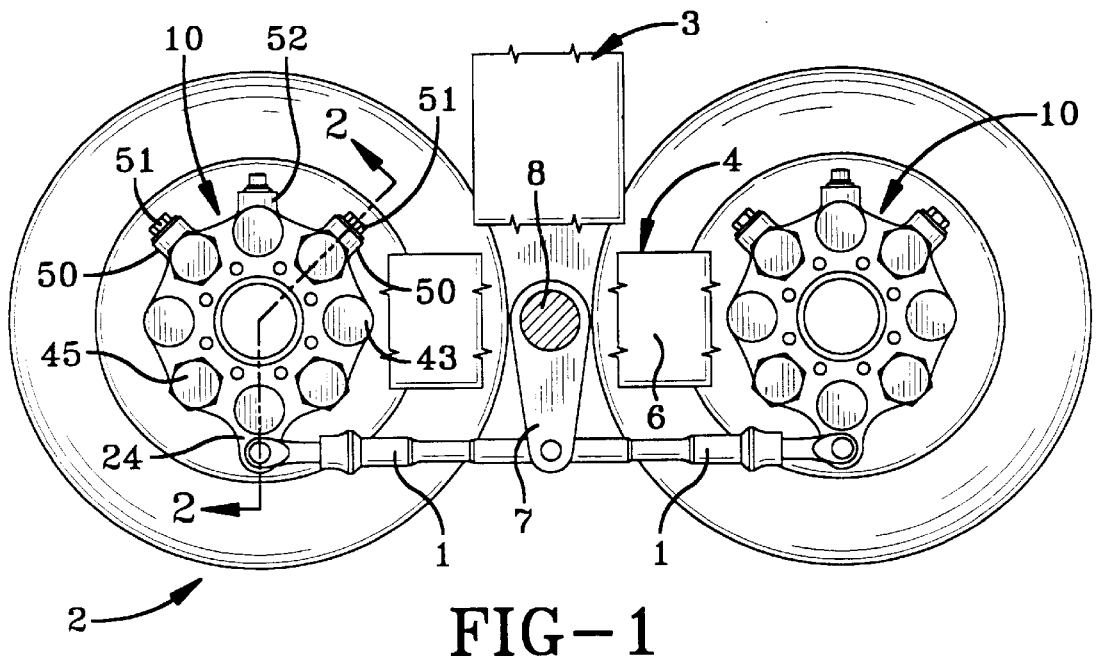
FIG. 1 is a partially schematic sectional view, partly broken away to illustrate pertinent features, of an aircraft landing gear embodying a damped brake rod in accordance with the invention.

Referring now in detail to the drawings, in FIG. 1 damped brake rods according to the invention are indicated at 1 and are shown integrated into a conventional aircraft landing gear indicated generally at 2. The illustrated landing gear 2 includes a strut 3 and a multi-wheel truck 4 pivotally connected to the strut. The beam 6 of the truck carries at opposite ends thereof respective axles for a plurality of wheel and brake assemblies 10. One end of each brake rod 1 is pivotally connected to a respective one of the wheel and brake assemblies while the other end is pivotally connected to an attachment lug 7 at the lower end of the strut. The pivot connection may be below the truck's pivot pin 8 as shown, or otherwise such as above the pivot pin while still achieving the same functionality.

It is noted here that the illustrated landing gear and below described wheel and brake assembly are exemplary in that the invention resides in the damped brake rod and in its integration into braking systems and particularly aircraft braking systems regardless of specific type. However, the invention has particular application to braking systems generally of the type herein described including, in particular, braking systems presently employed in the Boeing 767 aircraft.

Figure 3:
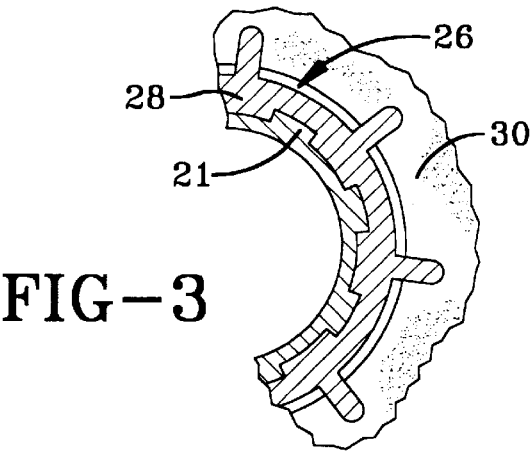
FIG. 3 is a partial sectional view taken along the line 3—3 of FIG. 2.
Figure 2:
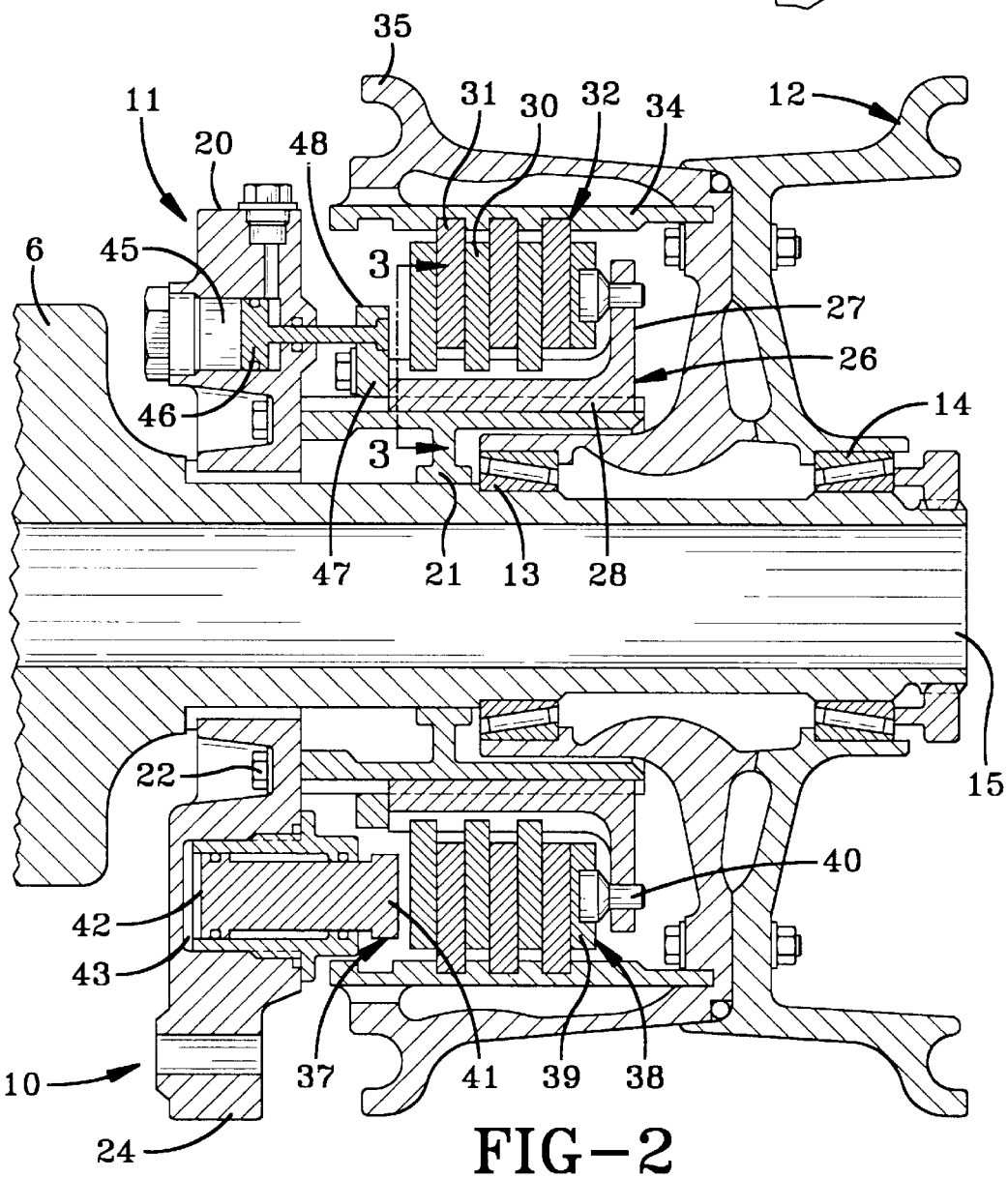
FIG. 2 is a sectional view of a representative exemplary wheel and brake assembly, taken substantially along the line 2—2 of FIG. 1.

Referring now additionally to FIGS. 2 and 3, a representative one of the wheel and brake assemblies is generally indicated at 10. The assembly 10 generally comprises a brake 11 and an aircraft wheel 12 which is supported for rotation by bearings 13 and 14 on a stationary axle 15. The axle 15 extends laterally from supporting structure such as the truck beam 6 only partially shown in FIG. 2.

The brake 11 includes a brake head 20 and a torque tube 21 which is attached to the brake head 20 by bolt fasteners 22. The brake head 20 is telescoped over the axle 15 and has a torque arm lug 24 to which the brake rod 1 is pivotally connected. The brake rod is connected between the torque arm lug and the strut to prevent the brake head from rotating around the axle along with the wheel when the brake is actuated.

For purposes of the description herein, the wheel side of the assembly 10 shown at the right in FIG. 2 is herein arbitrarily referred to as the rear or rearward end thereof and, conversely, the brake side of the assembly 10 shown at the left in FIG. 2 is herein referred to as the front or forward end of the assembly. The reference to front and rear, forward or backward, etc. is not intended to imply a specific orientation of the wheel and brake assembly, and the brake rod connected thereto, relative to any surrounding environment. Instead, these directional terms are intended to facilitate a description of the interrelationship between the several components of the brake and wheel assembly and their function.

The brake 11 further includes a sliding torque tube back leg 26 which has a radial flange portion 27 and a central hub portion 28 which extends forwardly from the flange portion. The hub portion 28 is splined to the torque tube 21 for axial sliding movement on the torque tube 21 while being rotatable therewith.

The back leg hub 28 is surrounded by stationary brake elements 30 and rotary brake elements 31 which are interleaved. The stationary and rotary brake elements are in the form of stator and rotor disks, and the interleaved arrangement thereof is commonly referred to as a disk pack or heat pack, the same being designated by reference numeral 32. The stator disks 30 are splined to the back leg hub 28 for axial movement while being coupled to the back leg 26 for rotation therewith. The rotor disks 31 are splined to a number of rotor drive keys 34 that are secured to the wheel 12 interiorly of the wheel's rim 35. As is conventional, the drive keys 34 are spaced around the circumference of the rim 35 to permit axial movement of the rotor disks 31 while being coupled to the wheel 12 for rotation therewith.

The interleaved stator and rotor disks 30 and 31 are located between front and back pressure members 37 and 38. In the illustrated assembly, the back pressure member 38 is formed by the radial flange 27 of the back leg 26 which carries thereon an annular disk 39 for engaging the rear end of the disk pack. The disk 39 that is attached to the radial flange 27 of the back leg 26 by several torque pucks 40. The torque pucks 40 preferably have the stems thereof loosely fitted in holes in the radial flange 27 to permit some swiveling movement thereof. In a modified arrangement the radial flange could be configured to engage directly the disk pack.

The front pressure member 38 is formed by one or more disk engaging means such as insulator pads 41 carried by respective actuator pistons 42 at the rear ends of the rearwardly extending piston rods thereof. The actuator pistons 42, also herein referred to as extender pistons, are housed for axial movement within respective actuator cylinders 43 in the brake head 20 in a circular arrangement concentric with the rotation axis of the wheel 12. As shown in FIG. 2, there are four circumferentially equally spaced apart actuator cylinders 43 having respective pistons 42. As is conventional, the insulator pads 41 function not only to transmit force but also to insulate the hydraulic fluid in the brake cylinders 43 from the heat of the disk pack when braking force is being applied.

The brake head 20 also includes at least one and preferably several retractor cylinders 45 that are circumferentially equally spaced apart in alternating relationship with the actuator cylinders 43. Each retractor cylinder 45 contains a retractor piston 46 that has a rearwardly extending rod attached to the front end of the back leg 26 by an attachment ring 47 at radially outwardly protruding ears 48 thereof. The central hub portion 28 functions as a linkage that extends axially coextensively with the disk pack 32 between the retractor pistons 46 and the radial flange portion 27 on which the back pressure member 39 is carried.

Both sets of actuator and retractor cylinders 43 and 45 are joined by internal passages in the brake head 20 to redundant ports 50. Hydraulic fluid pressure may be supplied via a fluid line connected to either one of the ports 50 to actuate the brake while the other port normally will be closed by a plug 51. The illustrated brake head is also provided with a bleed port 52, as is conventional.

When hydraulic pressure is supplied, the actuator pistons 42 extend to compress the disk pack 32 from the actuator housing side while the retractor pistons 46 retract to pull the back leg 26 forwardly toward the actuator housing with an opposite and preferably equal force. The resultant brake torque will be taken out by the stator disks 30 through the back leg 26 which is splined to the torque tube 21.

As indicated, an equal and opposite force is applied to the disk pack 32. In the illustrated assembly, this arises from the use of an equal number of actuator and retractor piston-cylinder assemblies that are of essentially equal size.

As the brake wears the back leg 26 will be pulled by the retractor pistons 42 toward the brake head 20 while the actuator pistons continue to extend and adjust the running clearance of the brake in a conventional manner. The back leg allows the disk pack to be compressed and adjusted from the wheel side of the disk pack as well as from the brake head side of the disk pack.

Referring now to FIGS. 4 and 5, the brake rod 1 comprises first and second rod parts 60 and 61 that are connected together for relative telescoping axial movement. At their outer ends the rod parts 60 and 61 are respectively configured, as in conventional manner, for connection to the attachment lug 7 at the lower end of the strut and to the wheel and brake assembly 10. The axially outer or terminal end of the first rod part may be in the form of a clevis 63 adapted for pin connection to the attachment lug. As shown in FIG. 5, the center plane of the clevis 63 may be laterally offset from the longitudinal axis 65 of the brake rod to accommodate a similarly laterally offset clevis of the other brake rod that is connected to the same attachment lug of the strut. The axially outer or brake end of the second rod part 61 is in the form of an eye 67 adapted for pin connection to the torque arm lug 23 of the wheel and brake assembly.

Figure 6:
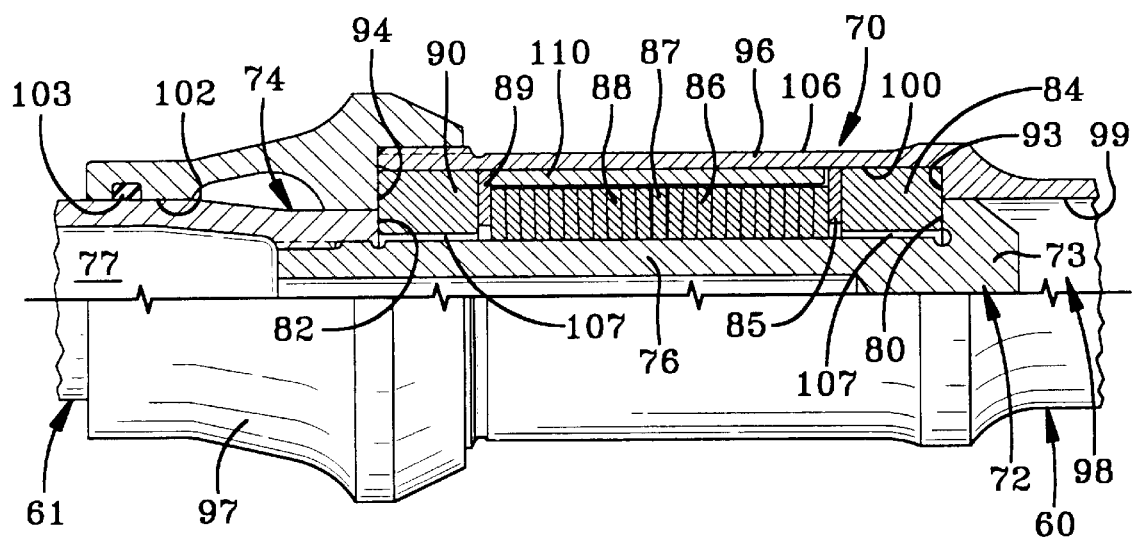
FIG. 6 is an enlarged portion of FIG. 5.

As best shown in FIG. 6, the axially inner end portion of the first rod part 60 forms a housing 70 in which the axially inner end portion of the second rod part 61 is guided for telescoping axial movement. Because of the similarity in arrangement to a piston-cylinder assembly, the axially inner end portion of the second rod part is herein referred to as a piston 72. The piston 72 includes a piston head 73 and an axially extending piston rod 74 that terminates at the eye 67. In the illustrated embodiment the piston rod 74 includes axially inner and outer sections 76 and 77. At its axially outer end the inner piston rod section 76 is externally threaded for convenience of attachment to outer piston rod section 77 which has a correspondingly internally threaded bore at its axially inner end. The piston head 73 is located at the axially inner end of the inner piston rod section and, as shown, is preferably formed integrally with the inner piston rod section.

The piston head 73 projects radially of the inner piston rod section 76 and forms at their intersection an axially outwardly facing abutment 80. The abutment 80 preferably is in the form of an annular shoulder, it being noted that the piston head and inner piston rod section 76 preferably are circular in cross-section in the illustrated preferred embodiment. The abutment 80 is opposed by an oppositely facing abutment 82 on the piston. In the illustrated embodiment the abutment 82 is an annular shoulder formed at the intersection of the inner piston rod section 76 with the outer piston rod section 77, the latter having an outer diameter greater than the outer diameter of the former.

The oppositely facing abutments 80 and 82 are axially spaced apart and accommodate therebetween in stacked relationship, going from right to left in FIG. 6, a first annular spacer 84, a wear washer 85, a first group or stack 86 of belleville washers, a floating wear washer 87, a second group or stack 88 of belleville washers, a wear washer 89 and a second annular spacer 90. The belleville washers of the two groups 86 and 88 cooperate to resiliently bias the spacers 84 and 90 in opposite axial directions with the spacer 84 being urged toward and against the piston shoulder 80 and the spacer 88 being urged toward and against the piston rod shoulder 90. As shown in FIG. 6 the stacked components are telescoped over the inner piston rod section 76 which functions to maintain the stacked components coaxially aligned and concentric with the longitudinal axis 65 of the brake rod.

Although various arrangements of the belleville washers may be employed, in the illustrated preferred embodiment the first group of relatively adjacent washers 86 are stacked one atop the other in parallel relationship with the concave sides thereof oriented in the same axial direction whereas the second group of relatively adjacent washers are stacked one atop the other in parallel relationship with the concave sides thereof oriented in the same axial direction but opposite the orientation of the first group of belleville washers. Preferably, the concave sides of the washers in each group 86, 88 of belleville washers face the relatively adjacent spacer 84, 90 such that the wear washers 85 and 87 are engaged by the outer diameter edge of the immediately adjacent belleville washers to provide greater resistance to cocking of the spacers when compared to the reverse orientation of the belleville washers.

In the foregoing arrangement the belleville washers are in frictional engagement with relatively adjacent washers. As will be appreciated from the following description, this frictional engagement contributes to coulomb damping of lateral and axial vibrations of the brake rod when subjected to oscillatory loads that may arise from brake vibrations. Preferably, every other washer is plated with a wear resistance material to increase the life of the brake rod, as are the wear washers. For example, chrome-plated washers may stacked alternately with unplated washers. The belleville washers may be formed from, for example, aerospace type steels (including stainless), or titanium.

As shown in FIG. 6, the spacers 84 and 90 are larger in diameter than the adjacent annular shoulders 80 and 82, respectively. Accordingly the spacers project radially beyond the shoulders. The outwardly projecting portions of the spacers are captured between oppositely facing abutments 93 and 94 in essentially the same manner that axially inner portions of the spacers are captured between the oppositely facing shoulders 80 and 82. To this end, the axial spacing between the abutments 93 and 94 is equal the axial spacing between the shoulders 80 and 82.

The abutments 93 and 94 are respectively formed by a piston chamber 96 and a cap 97 of the housing 70. The piston chamber 96 has a stepped center bore 98 (or shoulder at the step forming the abutment 93) including at a blind or closed end thereof an inner bore portion 99 in which the piston head 73 can move and at its open end a larger diameter bore 100 in which the stacked assembly of washers and spacers is located. The center bore 98, which opens to the axial end of the piston chamber, is closed by the cap 97 which has an axial surface forming the abutment 94. The cap includes a through bore 102 for passage of the piston rod 74 therethrough. The piston rod 74 can move axially in the bore 102 and a sliding seal 103, such as an O-ring, packing or other suitable sealing device, is provided to prevent foreign matter from passing into the interior of the piston chamber. The cap 97 has concentric with the bore 102 a larger diameter counterbore which is internally threaded for convenient attachment of the cap to the piston chamber 96 which is correspondingly externally threaded adjacent its axial end face to which the center bore 98 opens. As is preferred, the union between the cap, which may also be referred to as a closure nut in the illustrated embodiment, and the piston chamber may be potted in a suitable sealing compound such as in a room temperature vulcanizing rubber for sealing the union. In the foregoing manner the interior of the and the components housed therein are sealed from the environment, it being noted that the end of the center bore opposite the cap is blind or closed.

In the above described arrangement, the belleville washers 86 and 88 and the spacers 84 and 90 function as a plunger assembly operative to resiliently restrain movement of the rod parts relative to one another. More particularly, in the illustrated preferred arrangement, the belleville washers and spacers function as a double acting plunger assembly operative to resiliently restrain movement of the rod parts relative to one another in both axial directions. If a tensile load is applied to the brake rod 1 acting to pull the rod parts axially apart, the piston rod shoulder 80 will bear against the spacer 84. This will exert a force on the spacer 84 tending to compress the belleville washers interposed between the spacer 84 and spacer 90 which is engaged with the inner abutment 94 of the housing. The second rod part 61 will move against the resilient restraining force of the belleville washers when the force exerted by the washers on the spacer 84 is exceed by the tensile load applied to the brake rod. Conversely, if a compressive load is applied to the brake rod acting to push the rod parts 60 and 61 axially together, the piston shoulder 82 will bear against the spacer 90. This will exert a force on the spacer 90 tending to compress the belleville washers interposed between the spacer 90 and spacer 84 which is engaged with the abutment 93 of the housing. The second rod part 61 will move against the resilient restraining force of the belleville washers when the force exerted by the washers on the spacer 90 is exceeded by the compressive load applied to the brake rod. Accordingly, this double acting plunger assembly permits relative telescoping movement of the rod parts against the resilient restraining force of the belleville washers under both compressive and tensile loads, as might arise from vibrations induced in the brake rod as a result of brake generated vibrations.

In addition to functioning as a plunger, the spacers 84 and 90, made of a suitable structural material, also function as guide bushings or sleeves for the piston 72, the piston, or more particularly the piston rod section 76, passing through center holes in the spacers. To this end the spacers have an outer diameter that provides a close sliding fit with the inner diameter surface of the tubular wall 106 that maintains the spacers concentric with the longitudinal axis 65 of the brake rod. The center bores or holes in the spacers also provide a close sliding fit with the piston rod. However, there is intentionally provided additional radial clearance at 107 to permit limited lateral movement of the rod relative to the spacers. This permits lateral movement of one rod part relative to the other through the extent of the limited clearance. This lateral movement is opposed by the resilient restraining force of the belleville washers and is believed to contribute to lateral coulomb damping that dissipates vibrations imparted to the brake rod during braking. The clearance preferably is about 0.015 inch and more preferably about 0.008 inch.

A further function of the spacers 84 and 90 is that they provide a convenient way for varying a preload applied to the belleville washers 86 and 88. By selecting spacers of a desired axial thickness, the belleville washers may be preloaded by a corresponding amount. The thicker the spacers, the higher the preload with all other dimensions remaining the same. However, those skilled in the art will appreciate that still other means may be used to provide a desired preload or to adjust the preload.

Preferably, the belleville washers 86 and 88 are preloaded to 25% of their rated load capability. By way of a particular preferred example, the belleville washers are selected to provide a maximum load capability of about 90,000 pounds in which case the washers are preloaded to 22,500 pounds. At tensile or compressive loads less than 22,500 pounds, the brake rod will operate in the same manner as a conventional unitary brake rod. That is, the damped brake rod of the present invention and a conventional undamped brake rod will operate the same when subjected to vibratory load swings not greater than ±22,500 pounds. However, under vibratory load swings greater than about ±22,500 pounds (the preload), the damped brake rod will function to damp the vibrations induced in the brake rod.

According to another aspect of the invention, a load limiting device is provided to limit the extent to which the belleville washers are compressed. In the illustrated preferred embodiment, the load limiting device includes a sleeve 110 that surrounds the belleville washers 86 and 88 and is interposed between the spacers 84 and 90. The axial length of the sleeve is selected to limit the maximum load applied to the belleville washers to prevent permanent deformation thereof or other damage thereto. Preferably, the axial length of the load limiting sleeve is less than the spacing between the spacers 84 and 90 when the belleville washers have been compressed to provide a desired preload and greater than the spacing between the spacers that corresponds to full compression of the belleville washers flat one against the other. Preferably the length of the load limiting sleeve, or other load limiting device interposed between the spacers, is selected to limit the maximum load applied to the belleville washers to 90 percent of their maximum rated load.

Although the invention has been shown and described with respect to a preferred embodiment, it is obvious that equivalent alterations and modifications will occur to others skilled in the art upon the reading and understanding of this specification. For instance, the damped brake rod may have other useful applications as a force transmitting linkage member that may be subjected to vibratory loads passing from a first member to a second member. The present invention includes all such equivalent alterations and modifications, and is limited only by the scope of the following claims.

What is claimed is:

1. In an aircraft landing gear comprising a strut and a wheel and brake assembly carried on said strut, a brake rod that connects said wheel and brake assembly to said strut and bears an axial load during braking comprising:

first and second rod parts connected together for relative axial movement;

means for resiliently restraining movement of said first and second rod parts relative to one another in an axial direction; and, a lateral clearance between said first and second rod parts for permitting limited lateral deflecting movement of said first and second rod parts relative to one another against said means for resiliently restraining movement;

wherein said means for resiliently restraining movement comprises a plurality of adjacent resilient members interposed between said first and second rod parts to laterally damp vibrations imparted to said brake rod during braking.

2. The aircraft landing gear as set forth in claim 1, wherein said brake rod is laterally coulomb damped.

3. The aircraft landing gear as set forth in claim 1, wherein said plurality of adjacent resilient members comprise a plurality of belleville washers axially interposed between axially opposed portions of said first and second rod parts that resiliently restrain relative lateral movement between said first rod part and said second rod part.

4. An aircraft landing gear as set forth in claim 3, wherein said plurality of belleville washers includes a first group of relatively adjacent belleville washers stacked parallel one atop the other with the concave side thereof oriented in a first axial direction and a second group of relatively adjacent belleville washers stacked parallel one atop the other with the concave side thereof oriented in a second axial direction opposite said first axial direction.

5. An aircraft landing gear as set forth in claim 4, including a wear washer interposed between said first and second groups of washers.

6. An aircraft landing gear as set forth in claim 1, wherein said first rod part includes a piston housing, and said second rod part includes a piston guided in said piston housing, said plurality of adjacent resilient members comprising a plurality of belleville washers axially interposed between said piston and said piston housing, and including said lateral clearance between said piston and said piston housing for providing a deliberate amount of lateral movement of said rod parts relative to one another against the resilient restraining force exerted by said plurality of belleville washers.

7. An aircraft landing gear as set forth in claim 6, wherein said piston housing includes a piston chamber having an open end and a closed end, and an end wall closing said open end of said piston chamber, said piston includes a piston head axially movable in said piston chamber and a piston rod extending through said end wall of said piston housing, and said plurality of belleville washers are interposed between said piston head and said end wall.

8. An aircraft landing gear as set forth in claim 7, wherein said piston chamber has a tubular side wall extending between said open and closed ends, a pair of guide bushings are disposed within said tubular side wall for slidably engaging said tubular side wall, and said guide bushings have center bores for guided passage of said piston rod.

9. An aircraft landing gear as set forth in claim 8, wherein said guide bores are slightly greater in a transverse dimension than said piston rod to provide clearance that permits said limited lateral movement of said piston relative to said piston housing against the resilient restraining force of said plurality of belleville washers.

\* \* \* \* \*